Figure 1:
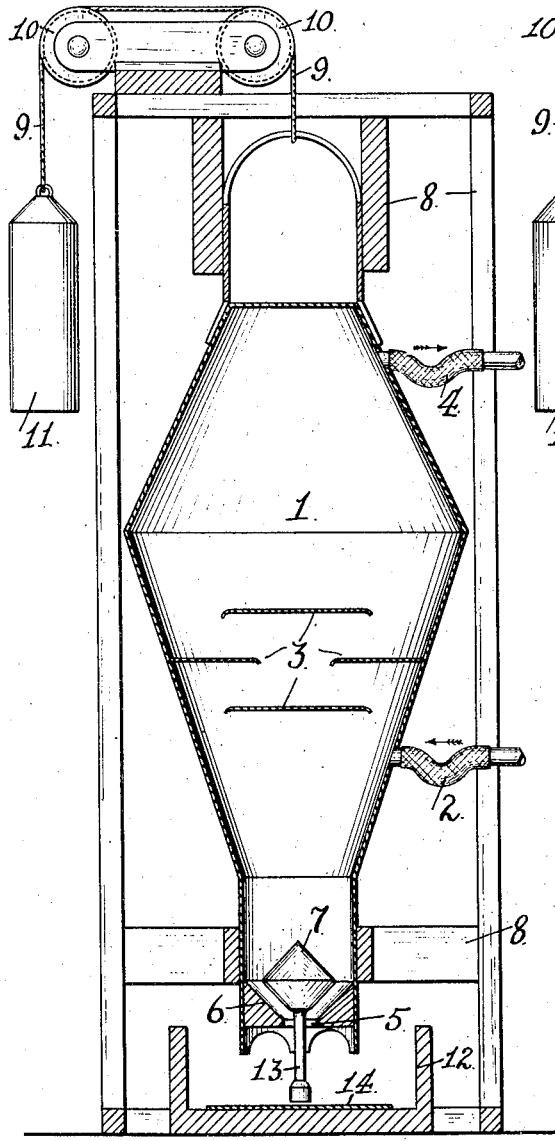

A. C. McLAUGHLIN.
APPARATUS FOR AUTOMATICALLY SEPARATING GASES FROM LIQUIDS.
APPLICATION FILED AUG. 5, 1912.

1,059,060.

Patented Apr. 15, 1913.

UNITED STATES PATENT OFFICE.

ANDREW C. McLAUGHLIN, OF PALO ALTO, CALIFORNIA, ASSIGNOR OF FORTY-NINE ONE-HUNDREDTHS TO HENRY B. TRUETT, OF SAN FRANCISCO, CALIFORNIA.

APPARATUS FOR AUTOMATICALLY SEPARATING GASES FROM LIQUIDS.

1,059,060. Specification of Letters Patent. Patented Apr. 15, 1913.

Application filed August 5, 1912. Serial No. 713,305.

*To all whom it may concern:*

Be it known that I, ANDREW C. MCLAUGHLIN, a citizen of the United States, residing at Palo Alto, in the county of Santa Clara and State of California, have invented certain new and useful Improvements in Apparatus for Automatically Separating Gases from Liquids, of which the following is a specification.

My invention relates to the class of apparatus and devices for separating gases from liquids, and particularly to such as are adapted for and are used in connection with the separation of natural gas from the oil and sand delivered from or flowing out of oil wells.

In the production of crude oil when it flows or is pumped from the well, it is accompanied by more or less natural gas, and sand, the former of which, under ordinary conditions, escapes into the atmosphere and is lost. As natural gas is of considerable value for light, heat and power, it is of great advantage to conserve it. It is, however, necessary in so doing, not to interfere with the free flow of the liquid from the well.

In my invention I have provided for overcoming the objectionable feature of intermittent action on which all previous separators of which I have any knowledge are based and which makes them unsuitable for successful operation in connection with flowing oil wells for several reasons, one being that the intermittent action of the separator will disturb the pressure within it, which disturbance will in turn be transmitted to the well; and in the case of a flowing well will either reduce the production or even cause it to stop flowing. In the case of a pumping well, much trouble is often experienced with the pump valves which will not seat properly because of gas intermingled with the oil, and it is found that often the only way to overcome the trouble is to keep the back pressure on the well constant. Any separator attached to such a well should be continuous and perfectly balanced in its action.

In my invention I have overcome the objection to previous devices by providing a separator which is perfectly balanced, sensitive, and at the same time positive in its operation, maintaining any pressure for which it is adjusted, no matter at what rate fluid enters the separator.

Another reason why continuous action of the separator is essential is because of sand contained in the oil, which sand if not removed as fast as it enters the separator will cover the outlet and render the valve of any separator inoperative. This is a very serious condition met with in handling oil from California oil wells, which often produce many tons of sand. In my invention I have made a great improvement by providing a separator in which, by reason of the continuous outflow of liquid, the sand is washed out as fast as it enters the separator. To this end the valve in my separator is so designed and placed that no sand or other foreign matter can lodge or accumulate within the separator, for whenever the liquid is flowing into the separator, the valve is open a corresponding amount, and the valve is located at the deepest point or bottom of the separator.

My invention, which is essentially an apparatus for automatically separating gases from liquids, was developed primarily for separating and conserving natural gas from a flowing or pumping oil well. It is, however, not intended that its use shall be confined to oil wells, as it may be equally efficient in automatically separating gas from other liquids.

The nature of my invention and the manner of its construction and operation, will be fully ascertained from the following description, taken in connection with the accompanying drawings, in which—

Figure 2:
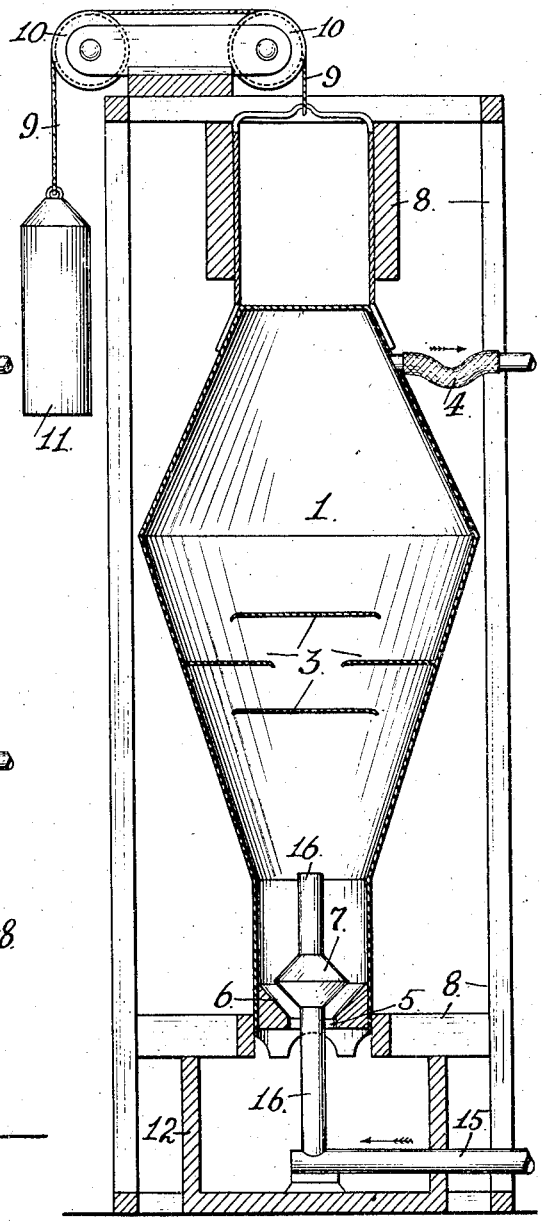

Figure 1 is a vertical sectional view of my apparatus. Fig. 2 is a similar view showing a modification of the inlet connection and the arrangement of the automatic valve.

1 is a tank into which the combined gas and liquid are, in Fig. 1, delivered through a flexible inlet connection 2, under a slight pressure sufficient to expel the gas after separation, or under greater pressure, if desired.

The tank 1 is preferably, though not necessarily, enlarged at the upper portion above the inlet, to allow for the expansion of the gas and the separation of the liquid, which latter, due to its greater specific gravity, settles at the bottom of the tank. Baffle plates 3 may also be provided to prevent particles of liquid being carried upward by the flow of gas. A suitable flexible connection 4 is made in or at the top of the tank for leading off the gas in pipes as may be desired.

The bottom of the tank is provided with a discharge opening 5 having a seat 6 for a valve 7, which is arranged to open upward, and which controls the flow of the liquid, together with the sand or foreign matter which may be contained in the liquid. To insure against the lodgment of sand or foreign matter, the valve 7 is best made with a sloping or conical upper surface, and the seat 6 for the valve is also made sloping throughout the cross-sectional area of the tank bottom.

The tank 1 is arranged in a suitable frame 8 in such a manner that it may move up and down within certain limits, and said tank is suspended by counterbalancing connections indicated by the cable 9, pulleys 10 and weight 11.

Under the tank is the trough 12 to carry off the liquid. The valve 7 has a stem 13, which protruding, is adapted to come in contact with a wearing plate 14 in the trough 12.

The operation of the valve 7 is automatically controlled by the liquid in such a manner that the outflow of the liquid is at the rate of inflow, so that no matter what the rate of inflow may be, the outflow is automatically controlled and the quantity of liquid in the tank is approximately constant. Thus the valve 7 in the lower part of the tank is at all times covered by this constant volume of liquid in the tank, which is maintained by the proper proportioning of the counterbalance weight to the weight of the tank and its liquid, and said valve is therefore always provided with a liquid seal, preventing the escape of the gas, the latter being drawn from the upper part of the tank where it collects, due to its specific gravity being much less than that of the liquid. The tank is also automatically relieved of liquid as fast as produced.

The automatic operation of the valve 7 in the bottom of the tank thus depends on the weight of the tank and the liquid as against the counterbalance. Thus the tank is free to move within certain limits and when it contains a weight of liquid added to its own weight to balance the counterweight, said tank will be in perfect balance and the valve will remain closed. Should more liquid flow into the tank, the weight of the tank and contents is necessarily increased, due to the additional liquid, the counterweight is overbalanced, and the tank descends, opening the valve by the contact of its stem 13 with the wearing plate 14, and allowing the liquid to escape, and thus lightening the tank, so that the counterbalance will again raise the tank and close the valve. If the inflow of liquid is constant, the apparatus will establish a balance at that position which will open the valve to the extent that the outflow will be at the rate of inflow. If the inflow is intermittent, so will be the action of the apparatus.

In Fig. 2 is shown a modification, in that the inlet for the oil and gas comprises a pipe 15 which passes through the wall of the trough 12 and connects with a pipe 16 which not only serves as part of the inlet conduit, but also as the valve-stem, the valve 7 being carried by said pipe. The pipes 15 and 16 are fixed relative to the tank 1, so that the discharge opening 5 of the tank is controlled by the valve in the same manner as above described, that is automatically by the rise and fall of the tank.

I claim—

1. An apparatus for automatically separating gases from liquids comprising a suspended tank having an inlet connection for the mixture, an outlet connection above for the separated gas, and a discharge opening in its bottom for the separated liquid; a valve operatable to control said discharge opening by the movement of the tank under the weight of its contents; and means for counterbalancing the tank adjusted to effect the operation of the valve to automatically keep the inflow to the tank equal to the outflow therefrom.

2. An apparatus for automatically separating gases from liquids comprising a suspended tank having an inlet connection for the mixture, an outlet connection above for the separated gas, and a discharge opening in its bottom for the separated liquid; a valve operatable to control said discharge opening by the movement of the tank under the weight of its contents; means for counterbalancing the tank adjusted to effect the operation of the valve to automatically keep the inflow to the tank equal to the outflow therefrom; and a delivery trough under the tank to receive the separated liquid from the discharge opening thereof.

3. An apparatus for automatically separating gases from liquids comprising a suspended tank having an inlet connection for the mixture, an outlet connection above for the separated gas, and a discharge opening in its bottom for the separated liquid; a delivery trough to receive the separated liquid from the discharge opening of the tank; a valve to control said discharge opening said valve coacting with the trough to effect its operation by the movement of the tank under the weight of its contents; and means for counterbalancing the tank adjusted to effect the operation of the valve to automatically keep the inflow to the tank equal to the outflow therefrom.

4. An apparatus for automatically separating gases from liquids comprising a suspended tank having an inlet connection for the mixture, an outlet connection above for the separated gas, and a discharge opening in its bottom for the separated liquid; a delivery trough to receive the separated liquid from the discharge opening of the tank; a valve to control said discharge opening, said valve having a stem which coacts with the trough to render the valve operatable by the movement of the tank under the weight of its contents; and means for counterbalancing the tank adjusted to effect the operation of the valve to automatically keep the inflow to the tank equal to the outflow therefrom.

5. An apparatus for automatically separating gases from liquids comprising a tank suspended for lineal movement, said tank having an inlet connection for the mixture, an outlet connection above for the separated gas, and a discharge opening in its bottom for the separated liquid, said opening being bordered by a valve-seat sloping downward throughout the cross-sectional area of the tank bottom; a valve for said valve-seat automatically operated to control said discharge opening by the lineal movement of the tank under the unbalanced gas pressure therein and the weight of its contents; and a counterbalance for the tank adjusted to effect the operation of the valve to automatically keep the inflow to the tank equal to the outflow therefrom.

6. An apparatus for automatically separating gases from liquids comprising a tank suspended for lineal movement, said tank having an inlet connection for the mixture, an outlet connection above for the separated gas, and a discharge opening in its bottom for the separated liquid, said opening being bordered by a valve-seat sloping downward throughout the cross-sectional area of the tank bottom; a valve for said valve-seat automatically operated to control said discharge opening by the lineal movement of the tank under the unbalanced gas pressure therein and the weight of its contents, said valve having a sloping upper surface; and a counterbalance for the tank adjusted to effect the operation of the valve to automatically keep the inflow to the tank equal to the outflow therefrom.

In testimony whereof I have signed my name to this specification in the presence of two subscribing witnesses.

ANDREW C. McLAUGHLIN.

Witnesses:
 WM. F. BOOTH,
 S. CONSTINE.